United States Patent [19]

Boyer et al.

[11] Patent Number: 4,514,176

[45] Date of Patent: Apr. 30, 1985

[54] AUTOMATIC TEACHING APPARATUS AND METHOD

[75] Inventors: Don S. Boyer, Placentia; John C. Freeborn, West Covina, both of Calif.

[73] Assignee: Honeywell Inc., Minneapolis, Minn.

[21] Appl. No.: 484,652

[22] Filed: Apr. 13, 1983

[51] Int. Cl.³ .............................................. G09B 5/00
[52] U.S. Cl. .................................. 434/224; 434/338; 434/340
[58] Field of Search ............................... 434/150–152, 434/130, 338, 340, 336, 153, 224

[56] References Cited

U.S. PATENT DOCUMENTS

| | | | |
|---|---|---|---|
| 2,876,562 | 3/1959 | Stieber | 434/152 |
| 3,065,554 | 11/1962 | Colabella | 434/152 |
| 4,052,798 | 10/1977 | Tomita et al. | 434/336 |

Primary Examiner—Richard C. Pinkham
Assistant Examiner—Leo P. Picard
Attorney, Agent, or Firm—George W. Field

[57] ABSTRACT

The method of determining which of several simulator probes in an automated training installation is engaging one of several simulator terminals, which method comprises energizing the terminals electrically and observing the probes individually to determine which has been electrically energized by engagement with a terminal.

4 Claims, 5 Drawing Figures

AUTOMATIC TEACHING APPARATUS AND METHOD

FIELD OF THE INVENTION

This invention relates to the field of automated education, and particularly to computer-supervised apparatus for training technicians in procedures pertinent to the maintenance and testing of complex electrical and electronic systems.

BACKGROUND OF THE INVENTION

There is presently an increased development of large, multi-partite systems for performing complex overall functions. Within increased complexity of the equipment has also come increased complexity in the steps of maintaining, servicing, and trouble shooting the equipment, and hence increased difficulty in training personnel for these functions. The practice has developed of creating at a training center a "simulator," that is, a structure having the physical appearance of the equipment to be serviced, and programming a computer with the steps of maintenance procedures. The simulator need not be capable of actually performing the functions of the equipment it simulates, but simply presents outputs, at identifiable terminals, which are identical with those which would be supplied by the equipment itself. Also provided are probes simulating those of volt meters, signal generators, oscilloscopes, and similar test equipment.

It is desirable that the computer be able not only to program the desired actions of the person being trained, but also to determine whether the intended step is in fact being performed. Thus, if the maintenance step is to check the voltage at the input to a particular unit, it is necessary to determine that the trainee using the simulator has selected the probe of a volt meter, and has applied it to the correct terminal.

BRIEF SUMMARY OF THE INVENTION

The present invention comprises apparatus, for use with a plurality of simulator probes and a plurality of simulator terminals, for determining which of the probes is being used, and which of the terminals it is being applied to.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
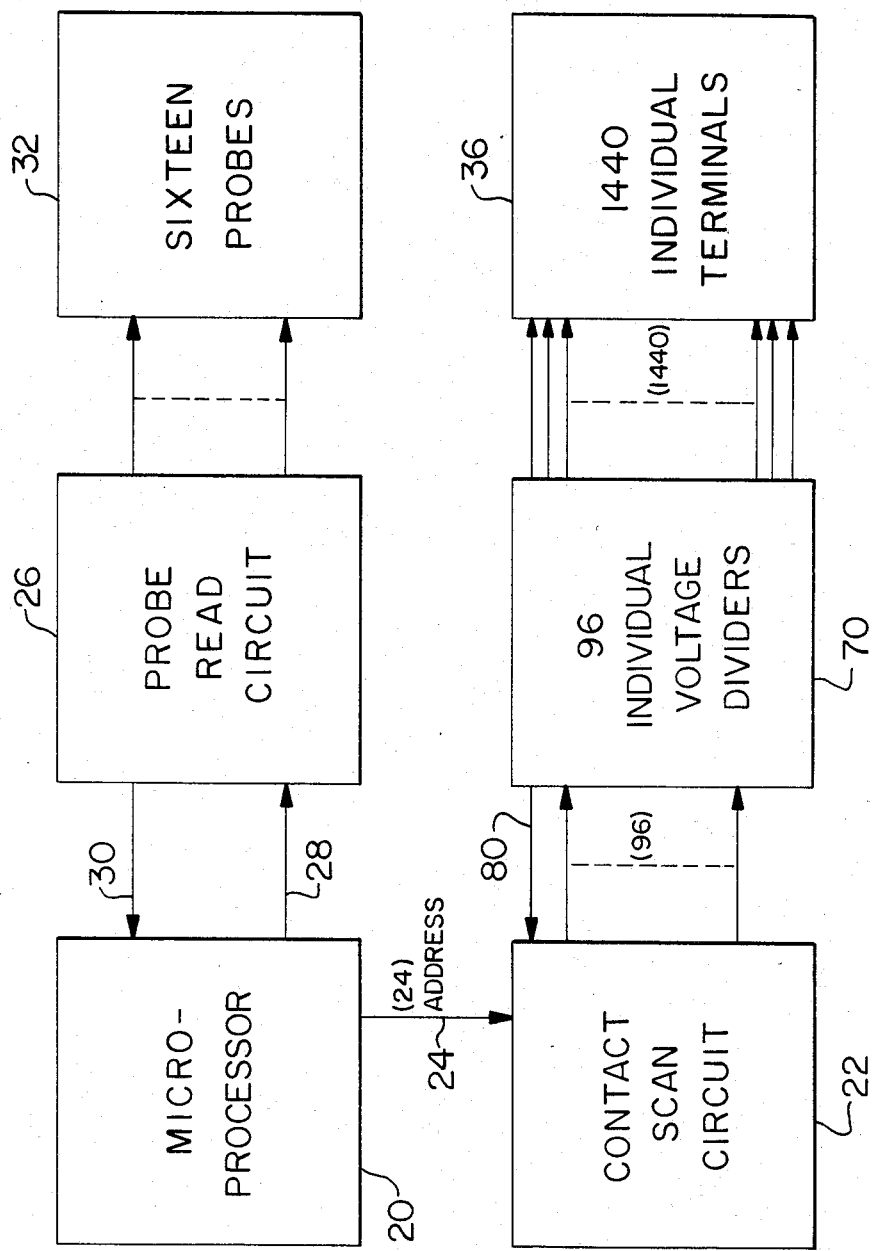
FIG. 1 is a block diagram of a system according to the invention, FIG. 2 gives more details of a "probe read" circuit used in the system, FIG. 3 gives more details of a "contact scan" circuit used in the system.

Turning now to FIG. 1, an automated training system according to the invention is shown to comprise a microprocessor 20 which addresses a contact scan circuit 22 through a cable 24, and which addresses a probe read circuit 26 through a cable 28 and receives data from circuit 26 through a cable 30, for comparison with correct data stored in the computer, or for display to enable human supervision of system operation.

Figure 2:
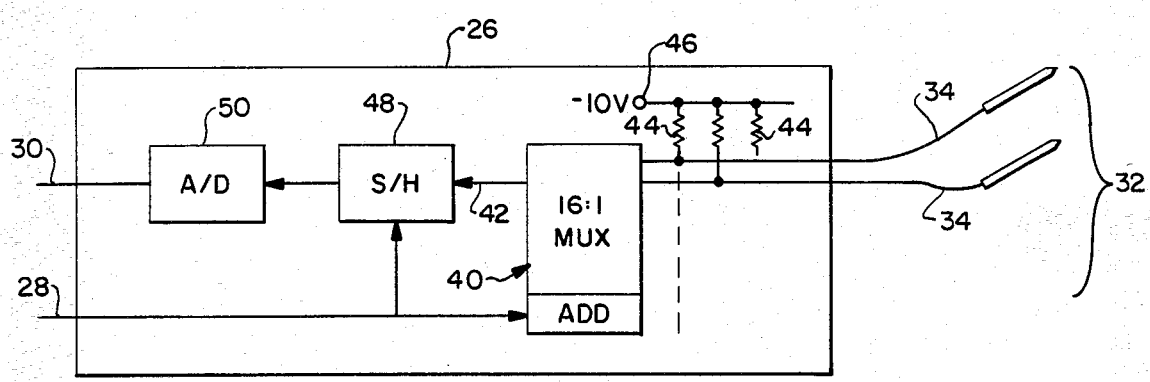
Figure 3:
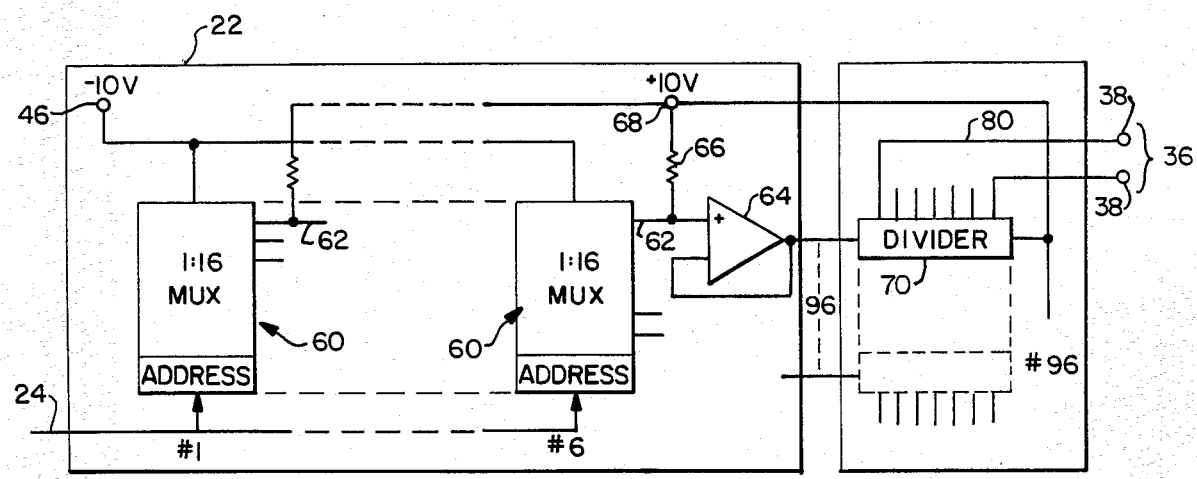

Circuit 26 is connected to a set 32 of individual simulator probes 34, see FIG. 2, up to 16 in number, and circuit 22 is connected to a plurality 96 of individual simulator terminals 38, see FIG. 3, which are located at known physical sites in the simulator.

Turning now to FIG. 2, probe read circuit 26 is shown to comprise a 16:1 multiplexer 40 addressed by microprocessor 20 on cable 28 to connect any selected one of probes 34 to an output 42. The probes are also individually connected through separate resistors 44 of 600,000 ohms resistance to a common source 46 of $-10$ volts. Output 42 is connected through a sample and hold device 48, also addressed by the microprocessor, to an analog-to-digital converter 50, which supplies to the microprocessor, on cable 30, a digital signal indicative of the voltage on the selected probe.

FIG. 3 shows that contact scan unit 22 comprises a plurality of 1:16 multiplexers 60, six in number, addressed by microprocessor 20 on cable 24. Each multiplexer 60 has a connection to negative source 46, and has 16 individually selected outputs 62 connected to the non-inverting inputs of operational amplifiers 64 having a gain of 1, and also connected through pull-up resistors 66 of 100,000 ohms resistance to a common source 68 of $+10$ volts. The output of each amplifier 64 is fed back to the inverting input of the amplifier, and also is connected through a voltage divider 70 to positive source 68.

Figure 4:
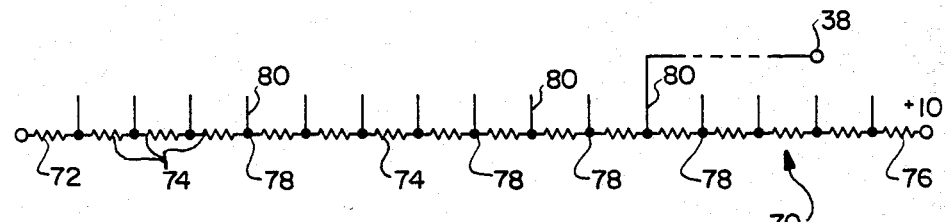
FIG. 4 shows a divider string used in the circuit of FIG. 3.
Figure 5:
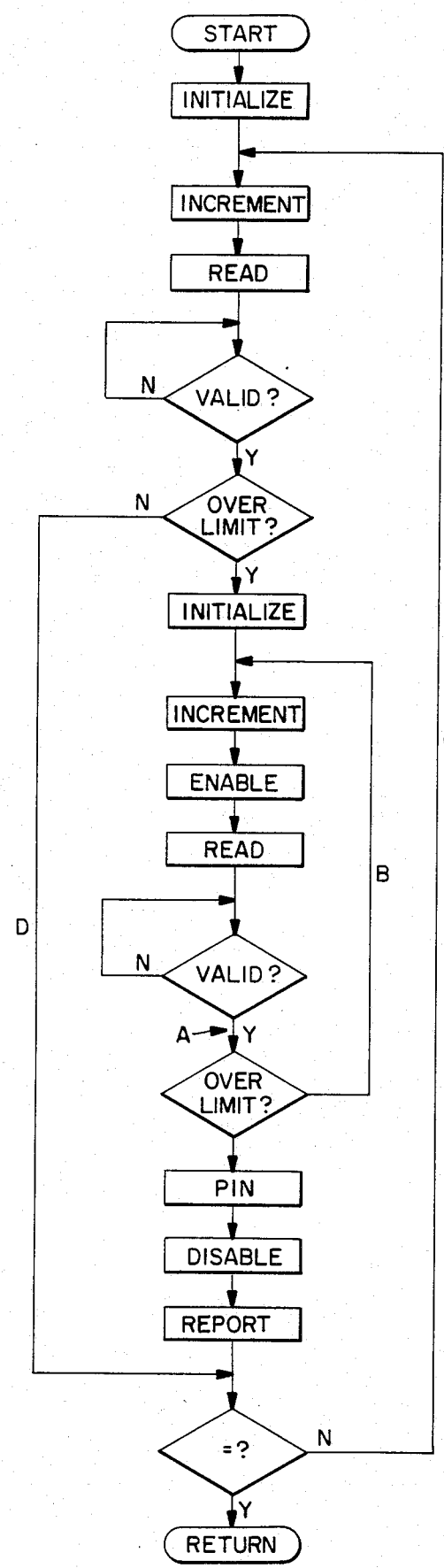
FIG. 5 is one possible flow chart for firmware control of the invention.

FIG. 4 showed that each divider 70 comprises a series string of resistors 72, 74, 76 interconnected at junction points 78, which are connected by conductors 80 to individual ones of terminals 38. Where terminals 38 are in a connector, the resistors may connect directly between connector terminals, thus eliminating separate conductors 80.

OPERATION

The operation of the apparatus is as follows. In an initial or stand-by mode, the microprocessor 20 holds the multiplexers of contact scan circuit 22 in a disabled mode, causing all the multiplexer outputs to be open circuited: this in turn permits the pull-up resistors 66 to cause all of the amplifier outputs to remain at $+10$ volts. Therefore, all the junction points 78 and all the terminals 38 are at $+10$ volts.

The program begins when microprocessor 20 addresses circuit 26 to sample probes 34 in sequence and convert their outputs. At this time the probes are not in use, but one or more may accidentally be in contact with ground, or perhaps with a trainees hand: any signals of this sort are disregarded. However, when the trainee touches any probe against any terminal, the probe comes to $+10$ volts. When the microprocessor reaches the address of whatever probe this may be, the address of that probe identifies to the microprocessor which probe is doing the contacting, and the positive 10 volt signal terminates the addressing of multiplexer 40 and puts the system into a second, contact scan mode.

In this second mode microprocessor 20 addresses multiplexers 60 to successively connect −10 volt source 46 to the voltage divider strings one after another, through a relatively low impedance, so that in succession the voltage dividers have 20 volts impressed across them. In each string, resistors 74 are all of the same value, resistor 72 is of half that value, and resistor 76 is of one and a half times that value, so that the voltages on terminals 78 range from −9.375 volts to +8.125 volts in steps of 1.250 volts.

When the microprocessor addresses the voltage divider string which includes the terminal engaged by the probe, the voltage sensed by the probe changes from +10 volts to some other voltage determined by which terminal is being engaged. This signal is fed back through converter 50 to the computer, where it may be compared to a program signal.

It will now be evident that the address at which multiplexer 40 stops identifies which simulator probe the trainee has selected, and that the address of multiplexer 60 at which the probe signal changes its value, and the new value itself, identify which terminal of the simulator the trainee is contacting. Further or corrective procedures may follow as is desired in teaching systems of this type.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. In a teaching machine, in combination:
 a plurality of resistors interconnected at junction points in a plurality of individual series circuits;
 a plurality of simulator terminals, at predetermined locations, connected in known relation to said junction points;
 a plurality of simulator probes engagable individually with any one of said terminals;
 voltage responsive output means;
 means selectively connecting said output means to said probes individually in a first sequence;
 means initially maintaining all said junction points at a predetermined voltage, so that when a selected probe is brought into engagement with any terminal, said output means gives an output, whereby to indicate which of said probes is engaging some contact by the site in said first sequence at which said output is given;
 and means for successively establishing voltage differences across selected ones of said circuits in a second sequence, so that the voltages at said junction points in each selected circuit differ mutually and from said predetermined voltage, whereby, when the terminal engaged by said probe is in connection with a junction in the selected circuit, said output changes to a value which identifies the location of the terminal.

2. In a teaching machine, in combination:
 a plurality of resistors interconnected at junction points in a plurality of individual series circuits;
 a plurality of simulator terminals, at predetermined locations, connected in known relation to said junction points;
 a plurality of simulator probes engagable individually with any one of said terminals;
 voltage responsive output means;
 means including a first multiplexer for selectively connecting said output means to said probes individually in a first sequence;
 means initially maintaining all said junction points at a predetermined voltage, so that when a selected probe is brought into engagement with any terminal, said output means gives an output, whereby to indicate which of said probes is engaging some contact by the site in said first sequence at which said output is given;
 and further multiplexer means for successively establishing voltage differences across selective ones of said circuits in a second sequence, so that the voltages at said junction points in each selective circuit differ mutually and from said predetermined voltage, whereby, when the terminal engaged by said probe is in connection with a junction in the selected circuit, said output changes to a value which identifies the location of the terminal.

3. A teaching machine according to claim 2 in which the means for successively establishing voltage differences is responsive to said output.

4. The multiplexer method of remotely determining which of several simulator terminals in an automated training installation is being engaged by a simulator probe, which method comprises sequentially energizing sets of said terminals at known, distinguishable potentials, and observing the time in the sequence at which a probe output is given, and the magnitude of the output, as identification of the terminal being contacted.

* * * * *